United States Patent

Kepplinger et al.

[11] Patent Number: 5,989,308
[45] Date of Patent: Nov. 23, 1999

[54] PLANT AND PROCESS FOR THE PRODUCTION OF PIG IRON AND/OR SPONGE IRON

[75] Inventors: Leopold-Werner Kepplinger, Leonding; Konstantin Milionis, Stiefling; Dieter Siuka, Neuhofen; Horst Wiesinger, Linz, all of Austria

[73] Assignee: Voest-Alpine Industriean-lagenbau GmbH, Linz, Austria

[21] Appl. No.: 08/817,263

[22] PCT Filed: Oct. 12, 1995

[86] PCT No.: PCT/AT95/00199

§ 371 Date: Apr. 17, 1997

§ 102(e) Date: Apr. 17, 1997

[87] PCT Pub. No.: WO96/12045

PCT Pub. Date: Apr. 25, 1996

[30] Foreign Application Priority Data

Oct. 17, 1994 [AU] Australia ................................ 1958/94

[51] Int. Cl.[6] .................................................. C21B 13/14
[52] U.S. Cl. .............................. 75/436; 75/446; 266/160; 266/172
[58] Field of Search ............................ 75/436, 492, 446; 266/160, 172

[56] References Cited

U.S. PATENT DOCUMENTS

| 5,082,251 | 1/1992 | Whipp | 266/142 |
|---|---|---|---|
| 5,185,032 | 2/1993 | Whipp | 75/436 |
| 5,238,487 | 8/1993 | Hauk et al. | 75/492 |
| 5,534,046 | 7/1996 | Kepplinger et al. | 75/446 |
| 5,535,991 | 7/1996 | Kepplinger et al. | 266/160 |
| 5,676,732 | 10/1997 | Viramontes-Brown et al. | 75/436 |

FOREIGN PATENT DOCUMENTS

| 376241 | 10/1984 | Australia . |
|---|---|---|
| 396255 | 7/1993 | Australia . |
| 0487856 | 6/1992 | European Pat. Off. . |
| 0594557 | 4/1994 | European Pat. Off. . |
| 4037977 | 6/1992 | Germany . |

*Primary Examiner*—Melvyn Andrews
*Attorney, Agent, or Firm*—Ostrolenk, Faber, Gerb & Soffen, LLP

[57] ABSTRACT

A plant for the production of pig iron and/or sponge iron includes a direct-reduction shaft furnace for lumpy iron ore, a melter gasifier, a feed duct for a reducing gas connecting the melter gasifier with the shaft furnace, a conveying duct for the reduction product formed in the shaft furnace connecting the shaft furnace with the melter gasifier, a top-gas discharge duct departing from the shaft furnace, feed ducts for oxygen-containing gases and carbon carriers running into the melter gasifier and a tap for pig iron and slag provided at the melting vessel. In order to be able to process not only lumpy ore, but also fine ore within a wide variation range with regard to quantity in a manner optimized in terms of energy and product, the plant includes at least one fluidized bed reactor for receiving fine ore, a reducing-gas feed duct leading to the fluidized bed reactor, an offgas discharge duct departing from the fluidized bed reactor and a discharge means provided for the reduction product formed in the fluidized bed reactor, wherein the top-gas discharge duct of the shaft furnace and the offgas discharge duct of the fluidized bed reactor run into a purifier and subsequently into a heat exchanger from which the reducing-gas feed duct of the fluidized bed reactor departs.

20 Claims, 1 Drawing Sheet

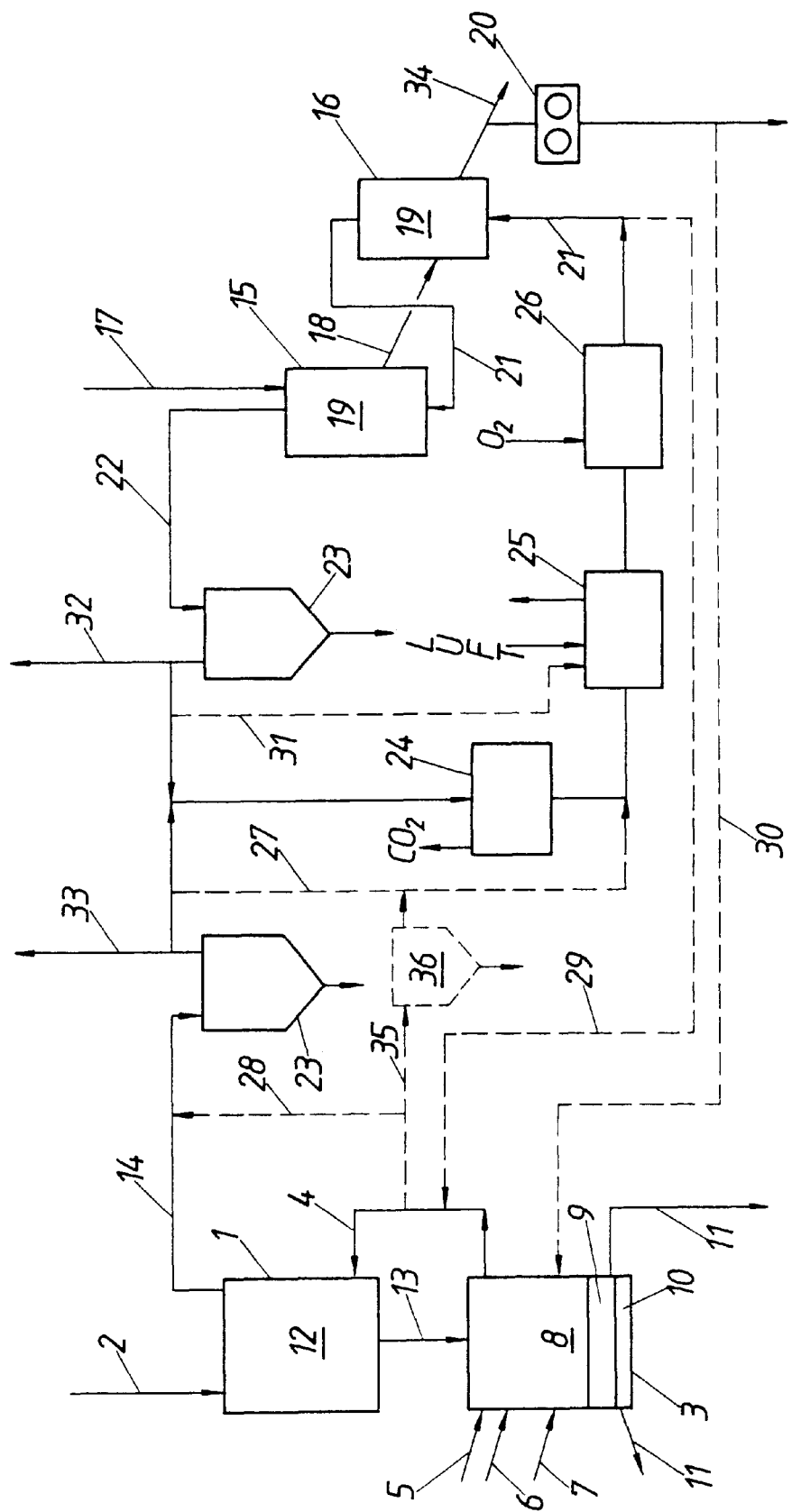

PLANT AND PROCESS FOR THE PRODUCTION OF PIG IRON AND/OR SPONGE IRON

The invention relates to a plant for the production of pig iron and/or sponge iron, comprising a direct-reduction shaft furnace for lumpy iron ore, a melter gasifier, a feed duct for a reducing gas connecting the melter gasifier with the shaft furnace, a conveying duct for the reduction product formed in the shaft furnace connecting the shaft furnace with the melter gasifier, a top-gas discharge duct departing from the shaft furnace, feed ducts for oxygen-containing gases and carbon carriers running into the melter gasifier and a tap for pig iron and slag provided at the melting vessel. Furthermore, the invention relates to a process for producing pig iron and/or sponge iron using this plant.

A plant of this type is known, for instance, from AT-B - 376.241 as well as from DE-C - 40 37 977. There, lumpy iron ore is reduced to sponge iron in a shaft furnace in a fixed-bed direct reduction zone. The sponge iron subsequently is melted in the melter gasifier in a meltdown gasifying zone under supply of carbon carriers and oxygen-containing gas. In the melter gasifier, a CO and $H_2$-containing reducing gas is produced, which is fed to the direct reduction zone of the shaft furnace via the feed duct connecting the melter gasifier with the shaft furnace, is reacted there and is drawn off as a top gas. In practice, that plant and process have proved successful for processing lumpy iron ore, by which ore having a grain size of above 3 mm, preferably above 6 mm, is understood.

The invention is based on the object to provide a plant as well as a process, by which not only lumpy ore, but also fine ore can be processed, in particular fine ore having a grain size of between 0 and 8 mm, preferably between 0 and 4 mm. In particular, it is to be feasible to widely vary the charging amount of lumpy ore and fine ore in proportion to the overall charging amount of ore while being able to operate the plant in a manner optimized in terms of energy and product over a wide range of the ratio of lumpy ore to fine ore amounts. This means that the product produced, i.e., pig iron and/or sponge iron, complies with a high quality standard at a minimum energy input, in particular exhibits a high degree of metallization and purity, such that further processing will be ensured without any problems.

With a plant of the initially defined kind, this object is achieved by at least one fluidized bed reactor intended to receive fine ore, a reducing-gas feed duct leading to said fluidized bed reactor, an offgas discharge duct departing from the fluidized bed reactor and a discharge means, preferably a briquetting means, provided for the reduction product formed in the fluidized bed reactor, wherein the top-gas discharge duct of the shaft furnace and the offgas discharge duct of the fluidized bed reactor run into a purification means, such as a scrubber, and subsequently into a heating means from which the reducing-gas feed duct of the fluidized bed reactor departs.

The processing of fine ore to sponge iron in a fluidized bed reactor, in principle, is known from U.S. Pat. No. 5,082,251. There, the reducing gas is produced by catalytic reformation of desulphurized and preheated natural gas with overheated water vapor in a reformer furnace. That process allows for the production of high-quality sponge iron, yet exclusively from fine ore.

By the combination according to the invention, of a shaft furnace plant as initially described with a fluidized bed reactor thereby forming a portion of the reducing gas fed to the fluidized bed reactor by the reducing gas produced in the melter gasifier and reacted to top gas in the shaft furnace, it is feasible to operate the plant at an optimum utilization of the energy from the energy carriers supplied, wherein the quantitative portion of fine ore or lumpy ore in the overall charging amount is variable within wide ranges even with an operation using exclusively fine ore being conceivable. Thus, according to the invention the amount of the ore type available in each respective case, i.e., fine ore or lumpy ore, can be taken into account in an optimum manner. Failures in the processing of lumpy ore caused by a high portion of fines as can occur in the prior art are avoidable in a simple manner because the fine ore merely must be separated and supplied to the fluidized bed in the fluidized bed reactor. This also helps to substantially reduce the problems involved in the storage of ore. Moreover, it is no longer necessary, as has been the case in the prior art, to process lumpy ore and fine ore in different plants involving accordingly high investment expenditures (avoidance of pelletizing plants).

Preferably, the feed duct for reducing gas formed in the melter gasifier is directly connected with the top-gas discharge duct of the shaft furnace via a bypass for bypassing the shaft furnace. Consequently, reducing gas that is not required for the reduction in the shaft furnace can be used as an excess gas for controlling the composition of the reducing gas introduced into the fluidized bed reactor and for increasing the capacity of fine ore processing.

Advantageously, a $CO_2$ stripping means is provided in the reducing-gas feed duct of the fluidized bed reactor for reducing the $CO_2$ content of the offgas formed in the fluidized bed reactor. Furthermore, the top-gas discharge duct of the shaft furnace advantageously runs into the reducing-gas feed duct of the fluidized bed reactor while avoiding the $CO_2$ stripping means.

In order to ensure the reducing gas temperature required for the direct reduction in the fluidized bed process, an afterburning means is provided in the reducing-gas feed duct of the fluidized bed reactor, in which part of the reducing gas is burnt under oxygen feeding. Thereby, it is feasible to adjust the temperature of the reducing gas according to the desired demands without any remarkable gas loss.

If an increase in capacity is sought in the production of pig iron in the melter gasifier, excess reducing gas available to the fluidized bed reactor suitably is fed to the shaft furnace for lumpy iron ore, to which end the reducing-gas feed duct of the fluidized bed reactor is connected with the reducing-gas feed duct of the shaft furnace via a branch duct.

If melting of the sponge iron produced in the fluidized bed reactor is desired, e.g., for utilizing excess energy of the melter gasifier, sponge iron suitably is introduced into the melter gasifier at least in partial amounts, to which end a conveying means for introducing the reduction product reduced in the fluidized bed reactor and preferably briquetted afterwards runs into the melter gasifier.

The process according to the invention for producing pig iron and/or sponge iron is characterized in that lumpy ore is reduced to sponge iron in a fixed-bed direct reduction zone, the sponge iron is melted in a meltdown gasifying zone under supply of carbon carriers and oxygen-containing gas and a CO and $H_2$-containing reducing gas is produced, which is introduced into the fixed-bed direct reduction zone, is reacted there and is drawn off as a top gas, and that fine ore is reduced to sponge iron in a fluidized-bed direct reduction zone according to the fluidized bed method, wherein top gas from the fixed-bed direct reduction zone and/or reducing gas produced in the meltdown gasifying zone, which are subjected to $CO_2$ stripping and heating, as well as offgas forming in the fluidized-bed direct reduction zone are fed to the fluidized-bed direct reduction zone and drawn off as an offgas.

Suitably, the offgas from the fluidized-bed direct reduction zone is mixed with top gas from the fixed-bed direct reduction zone and/or with reducing gas produced in the meltdown gasifying zone and is fed to the fluidized-bed direct reduction zone.

In order to reduce the $CO_2$ content of the reducing gas fed to the fluidized-bed direct reduction zone to the desired extent, the offgas from the fluidized-bed direct reduction zone suitably is subjected to $CO_2$ stripping.

To adjust the optimum temperature of the reducing gas used in the fluidized-bed direct reduction zone, it is heated in a heat exchanger. To this end, afterburning of the reducing gas, which preferably is provided in addition, may also be effected.

Advantageously, the reducing gas formed in the meltdown gasifying zone is fed to the fluidized-bed direct reduction zone while avoiding $CO_2$ stripping.

Direct reduction in the fluidized bed process may be effected in two or several steps, as is known, for instance, from U.S. Pat. No. 5.082,251. Furthermore, it is possible to carry out direct reduction by aid of a circulating fluidized bed known, for instance, from EP-B -0 364 865.

To take into account different charging amounts of lumpy ore and/or fine ore, a portion of the reducing gas fed to the fluidized-bed direct reduction zone advantageously is branched off and fed to the fixed-bed direct reduction zone.

To utilize the energy to the optimum decree, preferably at least a portion of the sponge iron formed in the fluidized-bed direct reduction zone is melted in the meltdown gasifying zone.

By means of the plant and process according to the invention it is possible to vary the charging amount of lumpy ore within a range of between 0 and 100%, preferably between 30 and 60%, of the overall ore input and to form the balance charge to 100% of fine ore.

In the following, the invention will be explained in more detail by way of an exemplary embodiment schematically illustrated in the drawing, wherein the Figure represented in the drawing illustrates the process scheme of a plant according to the invention.

Lumpy iron ore is top-charged into a shaft furnace 1 by a conveying means 2 via a sluice system not illustrated, optionally along with fluxes. The shaft furnace 1 communicates with a melter gasifier 3, in which a reducing gas is produced from coal and oxygen-containing gas, which reducing gas is fed to the shaft furnace 1 through a feed duct 4, a gas scrubbing and a gas cooling means optionally being provided in the feed duct 4.

The melter gasifier 3 comprises a supply duct 5 for solid carbon carriers, a feed duct 6 for oxygen-containing gases as well as, if desired, supply ducts 7 for carbon carriers that are liquid or gaseous at room temperature, such as hydrocarbons, as well as for burnt fluxes. Molten pig iron 9 and liquid slag 10 collect within the melter gasifier 3 below the meltdown gasifying zone 8 and are tapped via a tap 11.

The lumpy ore reduced to sponge iron in the shaft furnace 1 in a fixed-bed direct reduction zone 12 is supplied along with the fluxes burnt in the direct reduction zone 12 through a conveying duct 13 connecting the shaft furnace 1 with the melter gasifier 3, for instance, by means of delivery worms or the like not illustrated in detail. A top-gas discharge duct 14 for the top gas formed of reducing gas in the direct reduction zone 12 is connected to the top of the shaft furnace.

The plant, furthermore, comprises two fluidized bed reactors 15, 16 consecutively arranged in series, fine ore being conducted via a fine-ore supply duct 17 to the first fluidized bed reactor 15 and from there via a conveying duct 18 to the consecutively arranged fluidized bed reactor 16. The material completely reduced in one fluidized-bed direct reduction zone 19 each of the fluidized bed reactors 15, 16 (sponge iron), upon emergence from the second fluidized bed reactor 16, is supplied to a briquetting plant 20 where it is hot- or cold-briquetted. Prior to introducing the fine ore into the first fluidized bed reactor 15, it is subjected to an ore preparation, such as drying, which, however, is not illustrated in detail.

Reducing gas is conducted through a gas duct 21 in counterflow to the ore flow, from the fluidized bed reactor 16 to the fluidized bed reactor 15, i.e., to the fluidized-bed direct reduction zones 19 provided in the fluidized bed reactors and is carried off the first fluidized bed reactor 15—viewed in the ore flow direction—as an offgas through an offgas discharge duct 22.

Both the top gas drawn off the shaft furance 1 and the offgas drawn off the fluidized bed reactor 15 are each cooled and washed in a purification means 23 preferably designed as a wet scrubber and subsequently are mixed by the top-gas discharge duct 14 and the offgas discharge duct 22 running together. The mixed gas thus formed is passed through a $CO_2$ stripping means 24, preferably designed as a $CO_2$ scrubber, and is freed from $CO_2$. After this, heating of the mixed gas to a temperature of about 400° C. is effected in a heat exchanger 25. Following upon the same, there is an afterburning means 26, in which part of the mixed gas is burnt under oxygen supply, the mixed gas thus attaining the temperature required for the direct reduction in the fluidized bed reactors 15, 16 of up to about 850° C. This heated mixed gas then is available to the fluidized bed reactors 15, 16 as a reducing gas.

The lumpy ore and the fine ore are supplied to the plant either from separate stockyards or if mixed ore is to be processed this is subjected to ore screening, whereupon the coarse-grain fraction is supplied to the shaft furnace 1 and the fine-grain fraction is supplied to the fluidized bed reactor 15.

According to a preferred embodiment, only the offgas of the fluidized bed reactors 15, 16 is subjected to $CO_2$ scrubbing and the top gas drawn off the shaft furnace 1, via a bypass duct 27 provided to the $CO_2$ scrubber, is mixed with the offgas only after $CO_2$ scrubbing of the same. If only slight amounts of lumpy ore—based on the fine ore amounts charged—are employed or possibly no lumpy ore is reduced at all, the reducing gas formed in the melter gasifier 3, which in that case merely functions as a coal gasifying reactor, may directly be branched off the feed duct 4 running into the shaft furnace 1, via a bypass duct 28 bypassing the shaft furnace 1. This bypass duct 28 enters into operation also if excess gas incurs in the melter gasifier 3, i.e., more reducing gas than is required in the shaft furnace 1. By aid of this excess gas the gas composition of the reducing gas introduced into the fluidized bed reactors 15, 16 may be controlled. Thereby, an increase in the amount of fine ore reduced in the fluidized bed reactors 15, 16 can be obtained.

In case that an increase in the capacity of the reduction of lumpy ore in the shaft furnace 1 is required, excess gas of the reducing gas fed to the fluidized bed reactors 15, 16 may be introduced into the shaft furnace 1 via a branch duct 29.

Both the pig iron and the briquetted sponge iron are processed in a compact steel works, for instance equipped with electric furnaces and converters. If necessary, briquetted sponge iron also may be charged into the melter gasifier 3 through a conveying means 30 and melted there. This is advantageous, in particular, if excess energy is available in the melter gasifier 3.

Advantageously, the heat exchanger is operated with part of the offgas from the fluidized bed reduction, which is fed through a duct 31. Offgas that is not required for the reduction process or the heat exchanger 25 is supplied to other consumers through an export-gas discharge duct 32. This applies also for excess top gas, which may be supplied to consumers through a discharge duct 33. The discharge ducts 32 and 33 advantageously run into a gas collection tank, such as a gasometer, for the intermediate storage of the export gas and of the top gas. Thus, differences in gas production and deviations in pressure within the system may be checked and balanced out.

The briquetting plant 20 may be replaced with a discharge means 34, such as, e.g., a cold discharge means.

The wet scrubber 23 and the $CO_2$ scrubber 24 may be bypassed by a bypass duct 35 departing from the feed duct 4. This is advantageous because the gas leaving the melter gasifier 3 has a slight $CO_2$ content and it is, therefore, not necessary to conduct the gas through these means as long as the elevated sulfur content in the gas is not bothering. In addition, the system offers the opportunity of adjusting the $CO_2$ content in a more concerted manner. A dust separator 36 is integrated in the bypass duct 35.

All of the conveying means and gas ducts are equipped with control organs and compressors in a usual manner.

EXAMPLE

In a plant corresponding to the drawing and having a production capacity of 100 t/h of briquetted sponge iron of fine ore and approximately 100 t/h of sponge iron of lumpy ore, 148 t/h of fine ore were introduced into the fluidized bed reactors 15, 16 and 149 t/h of lumpy ore were introduced into the shaft furnace 1.

Limestone, dolomite and quartz are charged into the fluidized bed reactor 15 and/or into the shaft furnace 1 as fluxes in an amount of 27 t/h.

Coal in an amount of 800 kg/t of pig iron as well as oxygen in an amount of 540 $Nm^3$/t of pig iron are introduced into the melter gasifier 3.

109 t/h of sponge iron are discharged from the shaft furnace 1 and charged into the melter gasifier 3 and melted there. Pig iron incurs in an amount of 100 t/h and has the following chemical composition:

TABLE I

| Fe | 94.9% |
|---|---|
| C | 4.3% |
| Si | 0.4% |
| S | 0.04% |
| P | 0.08% |

30 t/h of slag are formed in the melter gasifier 3.

The reducing gas forming in the melter gasifier 3 by coal gasification, upon scrubbing and cooling, is injected into the direct reduction zone 12 of the shaft furnace 1 at about 850° C. It incurs in an amount of 190,000 $Nm^3$/h, having the following chemical composition:

TABLE II

| CO [%] | 69.60 |
|---|---|
| $CO_2$ [%] | 2.83 |
| $H_2$ [%] | 22.57 |

TABLE II-continued

| $H_2O$ [%] | 1.54 |
|---|---|
| $H_2S$ ppm | 500.00 |
| $CH_4$ [%] | 0.51 |
| $N_2$,Ar [%] | 2.90 |

Its calorific value is 11,300 $kJ/Nm^3$.

The top gas emerging from the shaft furnace 1 incurs in an amount of 160,000 $Nm^3$/h. Its chemical composition is indicated in Table III below.

TABLE III

| CO [%] | 42.30 |
|---|---|
| $CO_2$ [%] | 35.87 |
| $H_2$ [%] | 15.80 |
| $H_2O$ [%] | 2.26 |
| $H_2S$ ppm | 125.00 |
| $CH_4$ [%] | 1.06 |
| $N_2$,Ar [%] | 2.70 |

Its calorific value is 7,435 $kJ/Nm^3$.

The fine ore charged into the fluidized bed reactor 15 is comprised of ore having a maximum grain size of 8 mm. It is reduced to sponge iron in two steps and subsequently is hot-briquetted. The hot-briquetted sponge iron has a degree of metallization ($Fe_{met}$,$Fe_{tot}$) of 92%.

The reducing gas injected into the fluidized bed reactors 15, 16 is formed by mixing of the top gas drawn off the shaft furnace 1 with a portion of the offgas drawn off the fluidized bed reactor 15 arranged first in the flow direction of the fine ore. This offgas incurs in an amount of 189,766 $Nm_3$/h and has the following chemical composition:

TABLE IV

| CO [%] | 41.41 |
|---|---|
| $CO_2$ [%] | 25.28 |
| $H_2$ [%] | 17.10 |
| $H_2O$ [%] | 1.50 |
| $H_2S$ ppm | 22.31 |
| $CH_4$ [%] | 3.50 |
| $N_2$,Ar [%] | 11.21 |

Its calorific value is 8,337 $kJ/Nm^3$. 20,905 $Nm^3$ of this offgas are branched off as an export gas for other purposes of use via the export-gas discharge duct 32. 151,000 $Nm^3$/h of this off gas are mixed with the top gas drawn off the shaft furnace 1 after both the top gas and the offgas have been subjected to wet scrubbing.

The mixed gas thus formed (311,000 $Nm^3$/h) has a calorific value of 7,873 $kJ/Nm^3$. Its chemical composition is as follows:

TABLE V

| CO [%] | 41.87 |
|---|---|
| $CO_2$ [%] | 30.73 |
| $H_2$ [%] | 16.43 |
| $H_2O$ [%] | 1.89 |
| $H_2S$ ppm | 75.14 |
| $CH_4$ [%] | 2.24 |
| $N_2$,Ar [%] | 6.83 |

After $CO_2$ scrubbing of this mixed gas in the $CO_2$ scrubber 24, its chemical composition is as follows:

TABLE VI

| | |
|---|---|
| CO [%] | 61.34 |
| $CO_2$ [%] | 0.45 |
| $H_2$ [%] | 24.07 |
| $H_2O$ [%] | 0.70 |
| $H_2S$ ppm | 1.11 |
| $CH_4$ [%] | 3.32 |
| $N_2.Ar$ [%] | 10.11 |

It amounts to 210,140 Nm³/h, its calorific value being 11.547 kJ/Nm³. The gas carried off the $CO_2$ scrubber 24, which mainly contains $CO_2$, incurs in an amount of 100,860 Nm³/h. Its chemical composition is indicated in Table VII below.

TABLE VII

| | |
|---|---|
| CO [%] | 1.29 |
| $CO_2$ [%] | 93.81 |
| $H_2$ [%] | 0.51 |
| $H_2O$ [%] | 4.37 |
| $H_2S$ ppm | 229.38 |
| $CH_4$ [%] | 0.00 |
| $N_2,Ar$ [%] | 0.00 |

After this, heating of the mixed gas is effected in the heat exchanger 25 by burning offgas carried off the fluidized bed reactor 15 through gas duct 31 in an amount of 17,861 Nm³/h. For such burning the feeding of air in an amount of 32,184 Nm³/h is necessary.

Oxygen in an amount of 5,083 Nm³/h is fed into the mixed gas thus heated in the heat exchanger 25 such that a partial combustion of the mixed gas takes place. This mixed gas heated to a temperature of 820° C. then is available as a reducing gas for the direct reduction of fine ore in the fluidized bed reactors 15 and 16 in an amount of 210,846 Nm³/h, having a calorific value of 10,947 kJ/Nm³. Its chemical composition is indicated in Table VIII below.

TABLE VIII

| | |
|---|---|
| CO [%] | 58.16 |
| $CO_2$ [%] | 3.60 |
| $H_2$ [%] | 22.82 |
| $H_2O$ [%] | 2.19 |
| $H_2S$ ppm | 1.11 |
| $CH_4$ [%] | 3.15 |
| $N_2,Ar$ [%] | 10.09 |

We claim:

1. A plant for the production of pig iron and/or sponge iron, comprising a direct-reduction shaft furnace (1) for lumpy iron ore, a melter gasifier (3), a feed duct (4) for a reducing gas connecting the melter gasifier (3) with the shaft furnace (1), a conveying duct (13) for the reduction product formed in the shaft furnace (1) connecting the shaft furnace (1) with the melter gasifier (3), a top-gas discharge duct (14) departing from the shaft furnace (1), feed ducts (5,6,7) for oxygen-containing gases and carbon carriers running into the melter gasifier (3) and a tap (11) for pig iron and slag provided at the melting vessel (3), characterized by at least one fluidized bed reactor (15,16) intended to receive fine ore, a reducing-gas feed duct (21) leading to said fluidized bed reactor (15,16), an offgas discharge duct (22) departing from the fluidized bed reactor (15) and a discharge means (34), provided for the reduction product formed in the fluidized bed reactor (15,16), wherein the top-gas discharge duct (14) of the shaft furnace (1) and the offgas discharge duct (22) of the fluidized bed reactor (15) run into a purification means and subsequently into the same heating means (25,26) from which the reducing-gas feed duct (21) of the fluidized bed reactor (15,16) departs.

2. A plant according to claim 1, characterized in that the feed duct (4) for reducing gas formed in the melter gasifier (3) is directly connected with the top-gas discharge duct (14) of the shaft furnace (1) via a bypass (28) for bypassing the shaft furnace (1).

3. A plant according to claim 1, characterized in that a $CO_2$ stripping means (24) is provided in the reducing-gas feed duct (21) of the fluidized bed reactor (15, 16).

4. A plant according to claim 3, characterized in the top-gas discharge duct (14) of the shaft furnace (1) runs into the reducing-gas feed duct (21) of the fluidized bed reactor (15, 16) while avoiding the $CO_2$ stripping means (24).

5. A plant according to claim 1, characterized in that an afterburning means (26) is provided in the reducing-gas feed duct (21) of the fluidized bed reactor (15, 16).

6. A plant according to claim 1, characterized in that the reducing-gas feed duct (21) of the fluidized bed reactor (16) is connected with the reducing-gas feed duct (4) of the shaft furnace (1) via a branch duct (29).

7. A plant according to claim 1, characterized in that a conveying means for introducing the reduction product reduced in the fluidized bed reactor (15, 16), optionally briquetted afterwards, runs into the melter gasifier (3).

8. A process for the production of pig iron and/or sponge iron comprising
 reducing lumpy ore to sponge iron in a fixed-bed direct reduction zone, melting the sponge iron in a meltdown gasifying zone under supply of carbon carrier and oxygen-containing gas whereby a CO and $H_2$-containing reducing gas is produced, introducing said reducing gas into the fixed-bed direct reduction zone reacting it, there drawing it off as a top gas,
 reducing fine ore to sponge iron in a fluidized-bed direct reduction zone,
 wherein top gas from the fixed-bed direct reduction zone and/or reducing gas produced in the meltdown gasifying zone, which are subjected to $CO_2$ stripping and heating, as well as offgas forming in the fluidized-bed direct reduction zone (19) are fed to the fluidized-bed direct reduction zone and drawn off as an offgas.

9. A process according to claim 8, characterized in that the offgas from the fluidized-bed direct reduction zone (19) is mixed with top gas from the fixed-bed direct reduction zone (12) and/or with reducing gas produced in the meltdown gasifying zone (8) and is fed to the fluidized-bed direct reduction zone (19).

10. A process according to claim 8, characterized in that the offgas from the fluidized-bed direct reduction zone (19) is subjected to $CO_2$ stripping.

11. A process according to claim 8, characterized in that the reducing gas fed to the fluidized-bed direct reduction zone (19) is heated in a heat exchanger (25).

12. A process according to claim 8, characterized in that the reducing gas fed to the fluidized-bed direct reduction zone (19) is subjected to afterburning.

13. A process according to claim 8, characterized in that the reducing gas formed in the meltdown gasifying zone (8) is fed to the fluidized-bed direct reduction zone (19) while avoiding $CO_2$ stripping (24).

14. A process according to claim 8, characterized in that direct reduction is carried out in the fluidized bed process (19) in two or several steps.

15. A process according to claim 8, characterized in that a portion of the reducing gas fed to the fluidized-bed direct reduction zone (19) is branched off and fed to the fixed-bed direct reduction zone (12).

16. A process according to claim 8, characterized in at least a portion of the sponge iron formed in the fluidized-bed direct reduction zone (19) is melted in the meltdown gasifying zone (8).

17. A process according to claim 8 characterized in that the charging amount of lumpy ore is varied within a range of between 0 and 100% of the overall ore input and the balance charge to 100% is comprised of fine ore.

18. A process according to claim 17, wherein the charging amount of lumpy ore is varied within a range between 30 and 60% of the overall ore input.

19. A plant according to claim 1, wherein said discharge means (34) includes a briquetting means (20).

20. A plant according to claim 1, wherein said purification means is a scrubber (23).

* * * * *